(12) United States Patent
Kunugi et al.

(10) Patent No.: US 8,406,771 B2
(45) Date of Patent: Mar. 26, 2013

(54) WIRELESS COMMUNICATION SYSTEM, BASE STATION, AND WIRELESS COMMUNICATION METHOD

(75) Inventors: Takeshi Kunugi, Kawasaki (JP); Noboru Hasegawa, Kawasaki (JP); Reiko Hattori, Kawasaki (JP); Tadashi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 13/084,018

(22) Filed: Apr. 11, 2011

(65) Prior Publication Data
US 2011/0250894 A1     Oct. 13, 2011

(30) Foreign Application Priority Data

Apr. 12, 2010    (JP) .................................. 2010-91383

(51) Int. Cl.
*H04W 36/00*     (2009.01)
(52) U.S. Cl. ..... 455/440; 455/436; 455/442; 455/442.1; 455/432.1; 455/435.1; 370/331
(58) Field of Classification Search .................. 455/440, 455/436, 442, 422.1, 432.1, 435.1; 370/331
See application file for complete search history.

(56) References Cited

U.S. PATENT DOCUMENTS

| | | | |
|---|---|---|---|
| 7,280,835 B2 * | 10/2007 | Usuda et al. .................. | 455/450 |
| 2006/0166677 A1 | 7/2006 | Derakshan et al. | |
| 2010/0009682 A1 | 1/2010 | Iwamura et al. | |

FOREIGN PATENT DOCUMENTS

| | | |
|---|---|---|
| JP | 2004-180056 A | 6/2004 |
| JP | 2006-211645 | 8/2006 |
| JP | 2008-92381 | 4/2008 |
| JP | 2008-259046 | 10/2008 |

OTHER PUBLICATIONS

"3rd Generation Partnership Project; Technical Specification Group Radio Access Network; UTRAN Iub/Iur interface user plane protocol for DCH data streams (Release 6)", 3GPP TS 25.427 V6.8.0 (Dec. 2006), Dec 13, 2006.
"3rd Generation Partnership Project; Technical Specification Group Radio Access Network; UTRAN Iur interface user plane protocols for Common Transport Channel data streams (Release 6)", 3GPP TS 25.425 V6.6.0 (Dec. 2008), Dec 16, 2008.

* cited by examiner

*Primary Examiner* — Nghi H Ly
(74) *Attorney, Agent, or Firm* — Fujitsu Patent Center

(57) ABSTRACT

A wireless communication system, includes: a first base station; a second base station; a first terminal which transmits call connection data to the first base station; a second terminal which receives a call connection request; and a management device which manages location and movement of the first terminal, wherein the first base station employs a handover procedure to notify the management device, when receiving the call connection data from the first terminal, that a call connection destination of the second terminal which has received the call connection request is changed, and notifies the first terminal about a frequency of the second base station, and the first terminal transmits call connection data to the second base station based on the notified frequency.

10 Claims, 18 Drawing Sheets

FIG. 7

| PRESENCE OR ABSENCE OF OVERLAY BASE STATION | | 0: ABSENCE |
|---|---|---|
| | | 1: PRESENCE |
| INFORMATION ABOUT OVERLAY BASE STATION | ADDRESS | IP ADDRESS |
| | FREQUENCY OFFSET | OFFSET |
| | PRESENCE OR ABSENCE OF SECTOR 1 | 0: NOT IMPLEMENTED |
| | | 1: IMPLEMENTED |
| | PRESENCE OR ABSENCE OF SECTOR 2 | 0: NOT IMPLEMENTED |
| | | 1: IMPLEMENTED |
| | PRESENCE OR ABSENCE OF SECTOR 3 | 0: NOT IMPLEMENTED |
| | | 1: IMPLEMENTED |
| | NUMBER OF CALLS WHICH CAN BE ACCOMMODATED | NUMBER OF CALLS |
| INSTRUCTION TO OVERLAY BASE STATION | | 0: NORMAL |
| | | 1: OVERLAY |
| INFORMATION ABOUT MASTER BASE STATION | ADDRESS | IP ADDRESS |

FIG. 8

| | 48 |
|---|---|
| OPERATION STATUS OF OVERLAY BASE STATION | 0:NORMAL |
| | 1:DISCONNECTION |
| OPERATION STATUS OF SECTOR 1 | 0:NORMAL |
| | 1:IN TROUBLE |
| OPERATION STATUS OF SECTOR 2 | 0:NORMAL |
| | 1:IN TROUBLE |
| OPERATION STATUS OF SECTOR 3 | 0:NORMAL |
| | 1:IN TROUBLE |
| NUMBER OF CALLS WHICH CAN BE ACCOMMODATED | NUMBER OF CALLS |
| NUMBER OF CALLS IN USE | NUMBER OF CALLS |

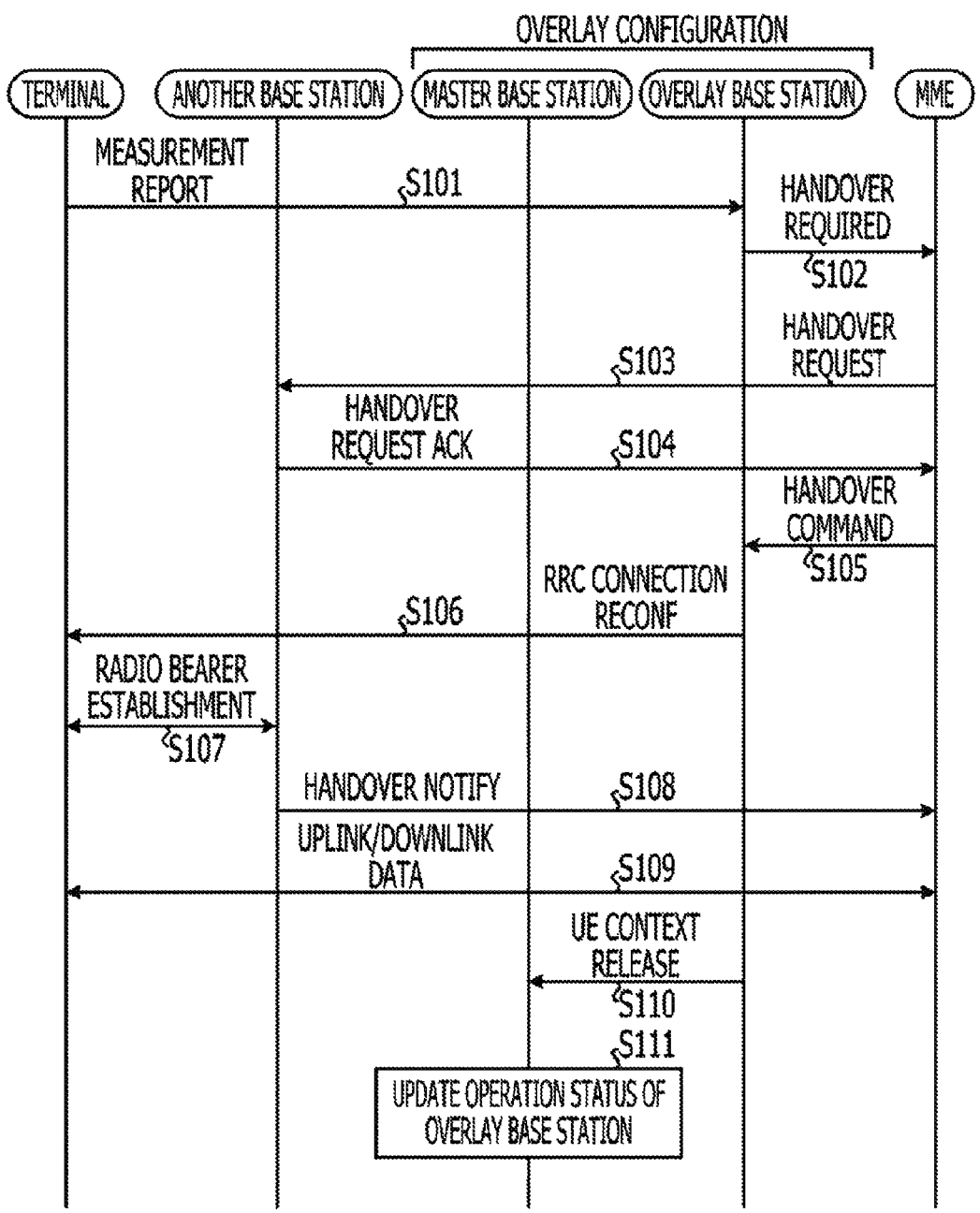

WIRELESS COMMUNICATION SYSTEM, BASE STATION, AND WIRELESS COMMUNICATION METHOD

CROSS-REFERENCE TO RELATED APPLICATION

This application is based upon and claims the benefit of priority of the prior Japanese Patent Application No. 2010-91383, filed on Apr. 12, 2010, the entire contents of which are incorporated herein by reference.

FIELD

This invention relates to a wireless communication system, a base station, and a wireless communication method.

BACKGROUND

Conventionally, more base stations have been established for increasing the number of usable wireless channels in an area when a wireless communication system in operation in this area has run short of usable wireless channels. To establish more base stations, there is a technology for connecting the base stations in cascade and allowing a master base station, which is one of the base stations, to control the call processing of the other of the base stations (see, for example, Japanese Unexamined Patent Application Publication No. 2004-180056).

SUMMARY

According to an aspect of an embodiment, a wireless communication system, includes: a first base station; a second base station; a first terminal which transmits call connection data to the first base station; a second terminal which receives a call connection request; and a management device which manages location and movement of the first terminal, wherein the first base station employs a handover procedure to notify the management device, when receiving the call connection data from the first terminal, that a call connection destination of the second terminal which has received the call connection request is changed, and notifies the first terminal about a frequency of the second base station, and the first terminal transmits call connection data to the second base station based on the notified frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a block diagram illustrating exemplary station data of the base station according to the second embodiment;

FIG. 8 is a diagram illustrating exemplary overlay-base station management data of the base station according to the second example;

FIG. 18 is a sequence diagram illustrating an exemplary handover procedure to another base station in the wireless communication method of the second embodiment;

DESCRIPTION OF EMBODIMENTS

Figure 1:
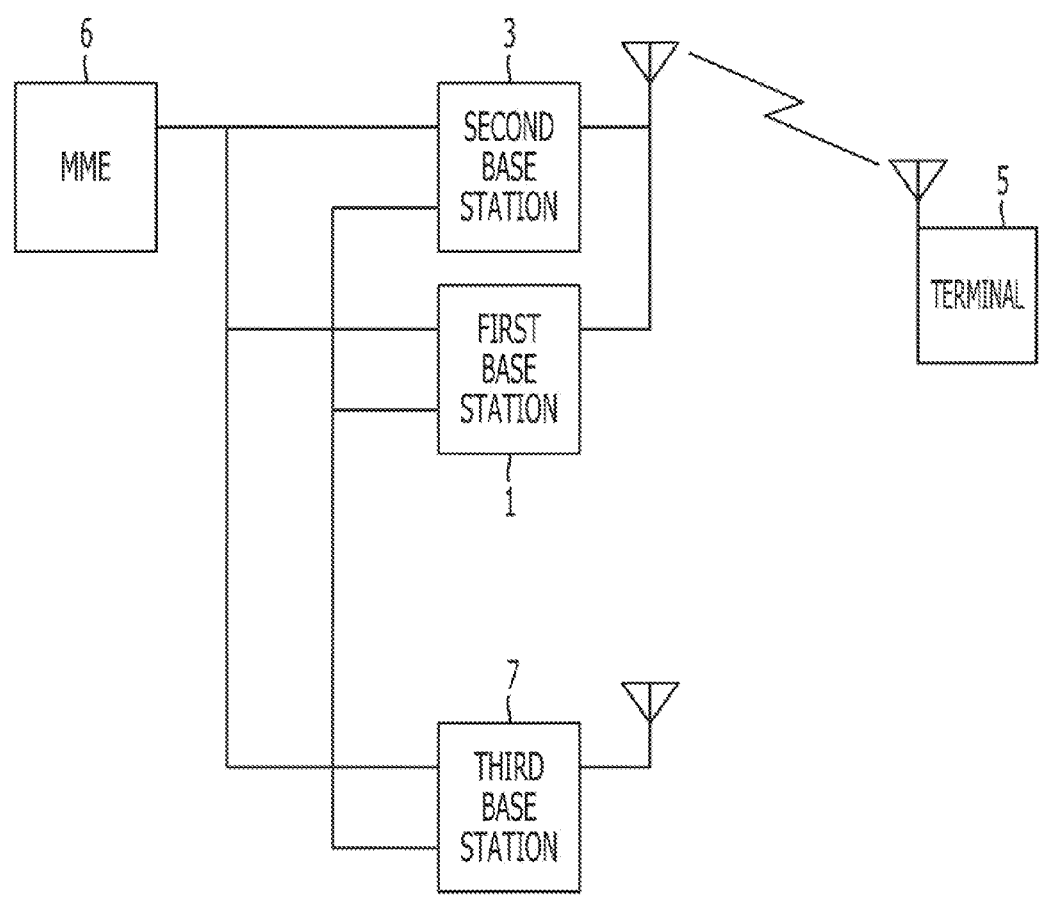
FIG. 1 is a block diagram illustrating a wireless communication system according to a first embodiment.

In the case of connecting base stations in cascade, there are problems of increased cost and increased failure rate occurred because of installation of a cascade interface unit. An arrangement of base stations for increasing the capacity of wireless channels may comprise placing an additional base station so that a communication coverage area, such as a cell or a sector, will overlap an existing base station and call processing of both stations will be controlled by an upper device. Such an arrangement of the base stations may be referred to as an overlay mode. The overlay mode allows an increase in channel capacity of a communication coverage area.

However, for example, a long term evolution (LTE) system, which has been standardized by the third generation partnership project (3GPP, a project for standardization of third generation mobile communications system), has no host device for controlling the call processing of a plurality of base stations. Therefore, in the LTE system, the following problem will occur when an additional base station B is installed on a base station A in an overlay mode.

The base station A is assumed as one which is transmitting notice information for call connection (perch channel). The base station B is assumed as one which is not transmitting notice information. The base station A and the base station B are connected to a mobility management entity (MME). The MME is a management device for managing the location and movement of each terminal and controlling the setting, release, and handover of connection between.

It is assumed that the base station A receives a call connection request from a terminal and notifies the frequency of the base station B to the terminal to change the call destination of the terminal to the base station B in a state before establishing call connection with the terminal. In this case, the terminal attempts to connect to the base station B using the frequency of the base station B. However, in this instance, the MME will mistakenly recognize that the terminal serves under the base station A because the MME manages the terminal in association with the base station that transmits notice information. In other words, the MME cannot recognize that the terminal serves under the base station B from which notice information is not transmitted. Thus, the MME attempts to receive data from the terminal via the base station A and transmit the data to the terminal via the base station A. Therefore, data transmission/reception cannot be performed between the MME and the terminal via the base station B.

An aspect of the present invention provides a wireless communication system, a base station, and a wireless communication system, which are capable of data transmission/reception between a management device and a terminal via a base station when a call connection destination of the terminal is changed to this base station from another base station, which has received a call connection request from the terminal, before call connection is established between the terminal and the base station.

The wireless communication system includes a first base station, a second base station, terminals, and a management device. The first base station transmits notice information for call connection. The second base station includes a communication coverage area which overlaps that of the first base station. A call connection is made between the terminal and the first or second bases station. The management device manages the location and movement of the first base station. When the first base station receives a call connection request from the terminal, the first base station notifies the management device about a call connection destination of the terminal, which has received the call connection request, using a handover procedure and also notifies the terminal about the frequency of the second base station. The terminal performs a call connection to the second base station based on the notified frequency.

According to such wireless communication system, base station, and wireless communication method, when a call connection destination of a terminal is changed from a base station that has received a call connection request to another base station before establishing a call connection between a terminal and a base station, data transmission/reception between a management device and the terminal can be performed via the base station of the changed call connection destination.

Hereinafter, preferred embodiments of the wireless communication system, base station, and wireless communication method will be described in details with reference to the attached drawings.

First Embodiment

Description of Wireless Communication System

FIG. 1 is a block diagram illustrating a wireless communication system according to a first embodiment. As illustrated in FIG. 1, the wireless communication system includes a first base station 1, a second base station 3, a terminal 5, and a MME 6 as a management device. The first base station 1 and the second base station 3 transmit electric waves from the same antenna with the same directivity and the same output, respectively. The communication coverage area of the second base station 3 overlaps the communication coverage area of the first base station 1. Here, even if these antennas are physically independent antennas, they are geographically mounted on the same area. Thus, they are referred to as the same antenna including an antenna group which can be considered as a single antenna. Even if their communication coverage areas do not completely coincide with each other, the communication coverage areas are considered as being overlapped with each other as long as an installation-personnel (telecommunications carrier) of the base station does not intentionally set the communication coverage areas to be shifted from each other. A case where the communication coverage area of one base station includes that of the other communication station may be one of the examples of the overlapped communication coverage areas. The first base station 1 and the second base station 3 are operated in an overlay mode. The first base station 1 transmits call connection data for call connection (perch channel). Call connection indicates that a connection for executing a communication between terminals. Call connection data includes, for example, RACH (Random Access Channel) preamble data, RRC (Radio Resource Control) data or the like. The first base station 1 performs the following operation when receiving a call connection request from the terminal 5. The first base station 1 employs a handover procedure to notify the MME 6 that the call connection destination of the terminal is changed to the second base station 3 when a call connection is not established between the terminal 5 and the first base station 1 or the second base station 3. In addition, the first base station 1 notifies the terminal 5 about the frequency of the second base station 3. The second base station 3 makes a call connection to the terminal 5 when notified from the MME 6 that the call connection destination of the terminal 5 is transferred to the own station using a handover procedure. The terminal 5 makes a call connection to the second base station 3 based on the frequency of the second base station 3 notified from the first base station 1.

The first base station 1 and the second base station 3 are connected to the MME 6. Furthermore, for example, the wireless communication system includes a third base station 7 as a cell adjacent to the first base station 1 and the second base station 3. The third base station 7 is not operated in an overlay mode with the first base station 1 or the second base station 3. The third base station 7 is connected to the MME 6. Signal transmission/reception between each of the base stations 1, 3, and 7 and the MME 6 is carried out using, for example, a S1 application protocol (S1AP). Among the first base station 1, the second base station 3, and the third base station 7, for example, signals are transmitted and received using an X2 application protocol (X2AP).

Description of Base Station

Figure 2:
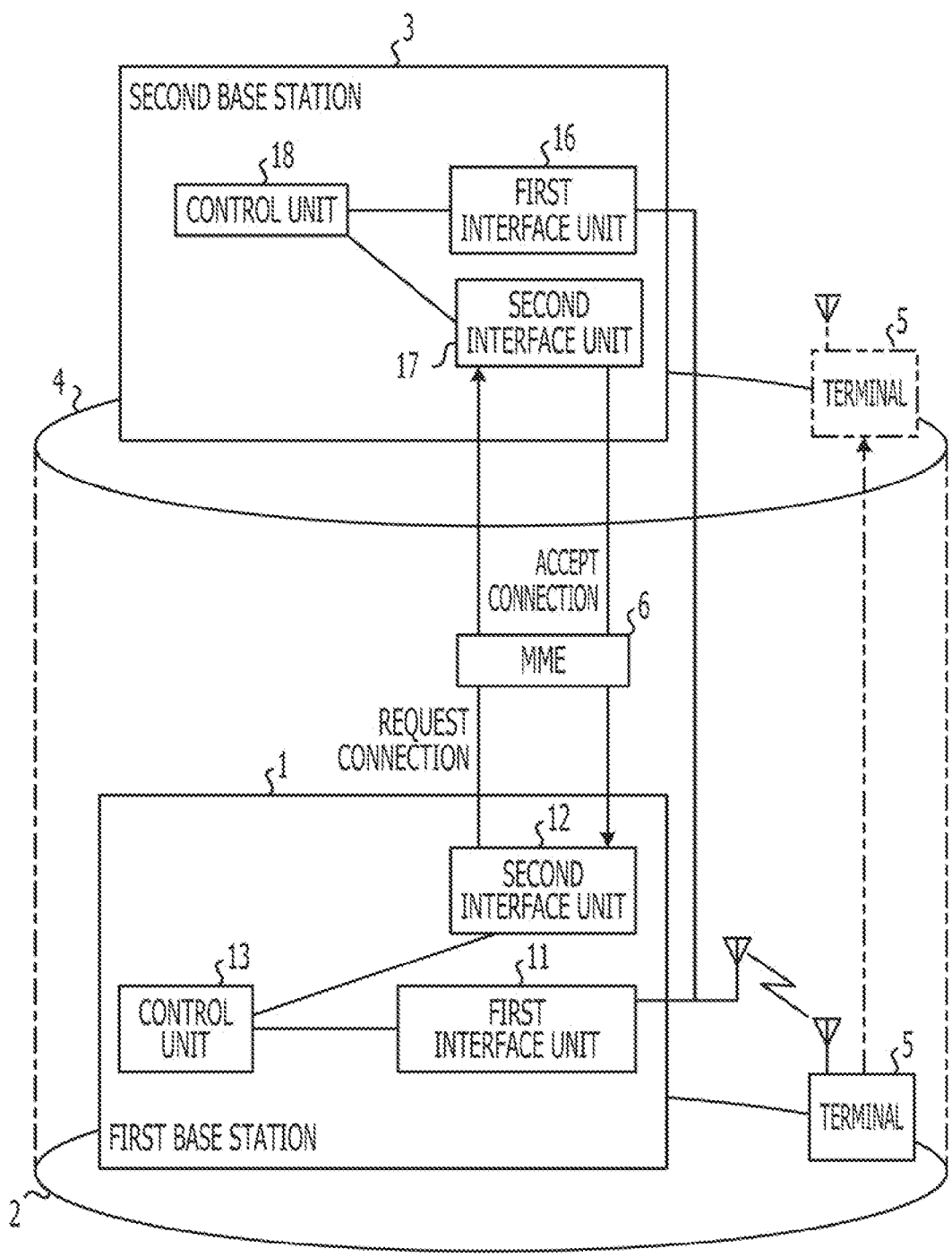
FIG. 2 is a block diagram illustrating a base station according to the first embodiment.

FIG. 2 is a block diagram illustrating a base station of the first embodiment. As illustrated in FIG. 2, the first base station 1 includes a first interface unit 11, a second interface unit 12, and a control unit 13. A CPU (Central Processing Unit), DSP (Digital Signal Processor) or the like provides functions executed by the control unit 13. The first interface unit 11 performs signal transmission/reception with the terminal 5. The second interface unit 12 is connected to the MME 6. Based on a call connection request from the terminal 5 which has received the call-connection notice information sent from the own station via the first interface unit 11, the control unit 13 employs a handover procedure to notify the MME, via the second interface unit 12, that the call connection destination of the terminal 5 is changed to the second base station having the communication coverage area 4 which overlaps the communication coverage area 2 of the terminal. The control unit 13 notifies the terminal 5 about the frequency of the second base station 3 via the first interface unit 11. The second base station 3 includes a first interface unit 16, a second interface unit 17, and a control unit 18. A CPU (Central Processing Unit), DSP (Digital Signal Processor) or the like provides functions executed by the control unit 18. The first interface unit 17 performs wireless signal transmission/reception with the terminal 5. The second interface unit 17 is connected to the MME 6. Based on a call connection request from the terminal 5 which has received the call-connection notice information sent from the first base station 1, the control unit 18 makes a call connection to the terminal 5 when it is notified from the MME 6 via the second interface unit 17 that the call connection destination of the terminal 5 is changed to the own station by using the handover procedure.

Description of Wireless Communication Method

Figure 3:
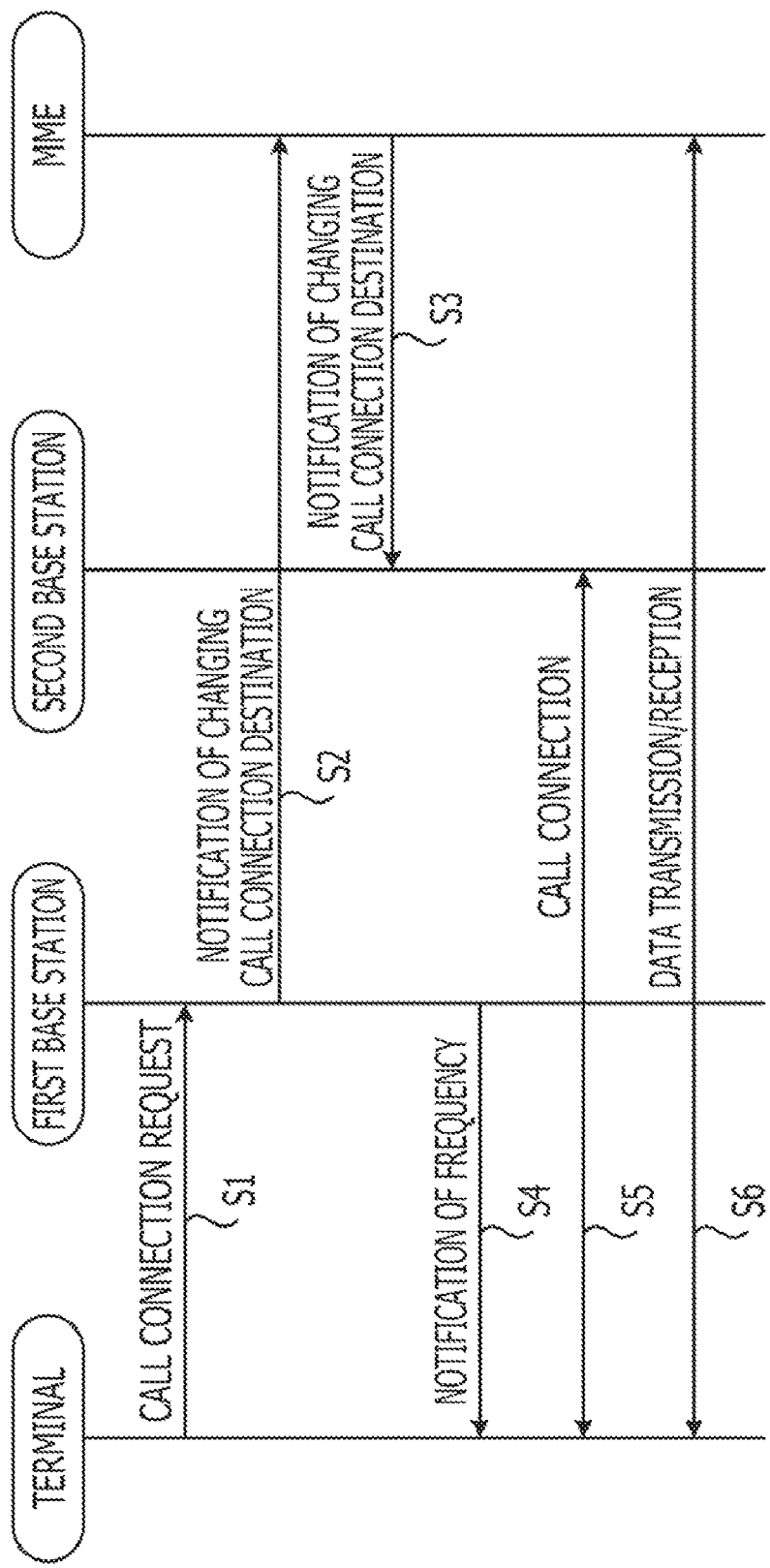
FIG. 3 is a sequence diagram illustrating a wireless communication method according to the first embodiment.

FIG. 3 is a sequence diagram illustrating a wireless communication method of the first embodiment. As illustrated in FIG. 3, when the first base station 1 receives a call connection request from the terminal 5 (step S1), the first base station 1 notifies the MME 6 that the call connection destination of the terminal 5 is changed to the second base station 3 by using the handover procedure (step S2). The second base station 3 notifies the MME 6 that the call connection destination of the terminal 5 is changed to the own station by using the handover procedure (step S3). After the step S1, the first base station 1 notifies the terminal 5 about the frequency of the second base station 3 (step S4). The terminal 5 makes a call connection to the second base station 3 based on the frequency notified from the first base station 1 to establish a call connection between the terminal 5 and the second base station 3 (step S5). Therefore, it initiates data transmission/reception on uplink and downlink between the terminal 5 and MME 6 via the second base station 3 (step S6).

According to the first embodiment, the first base station 1 notifies the MME 6 that the call connection destination of the terminal 5 is changed to the second base station 3. Thus, the MME 6 can recognize that the connection destination of the terminal 5 will be changed to the second base station 3. Since the second base station 3 is notified that the call connection destination of the terminal 5 is changed from the MME 6 to the own terminal, the second base terminal 3 can make a call connection to the terminal 5. In addition, the first base station 1 notifies the terminal 5 about the frequency of the second base station 3, so that the terminal 5 can make a call connection to the second base station 3. Therefore, even if the call connection destination of the terminal 5 is changed from the first base station 1 to the second base station 3 while any call connection between the terminal 5 and the first base station 1 or the second base station 3 is not established, the terminal 5 and the MME 6 can perform data transmission/reception between them via the second base station 3.

Second Embodiment

Any of the wireless communication system, base station, and wireless communication method according to the first embodiment is applicable to a wireless communication system in which communication coverage areas of two or more base stations overlap one another. In addition, it is also applicable to a wireless communication system having no upper device that controls two or more base stations with overlapped communication coverage areas. In the second embodiment, an exemplary application to a LTE system will be described.

Configuration of Wireless Communication System

Figure 4:
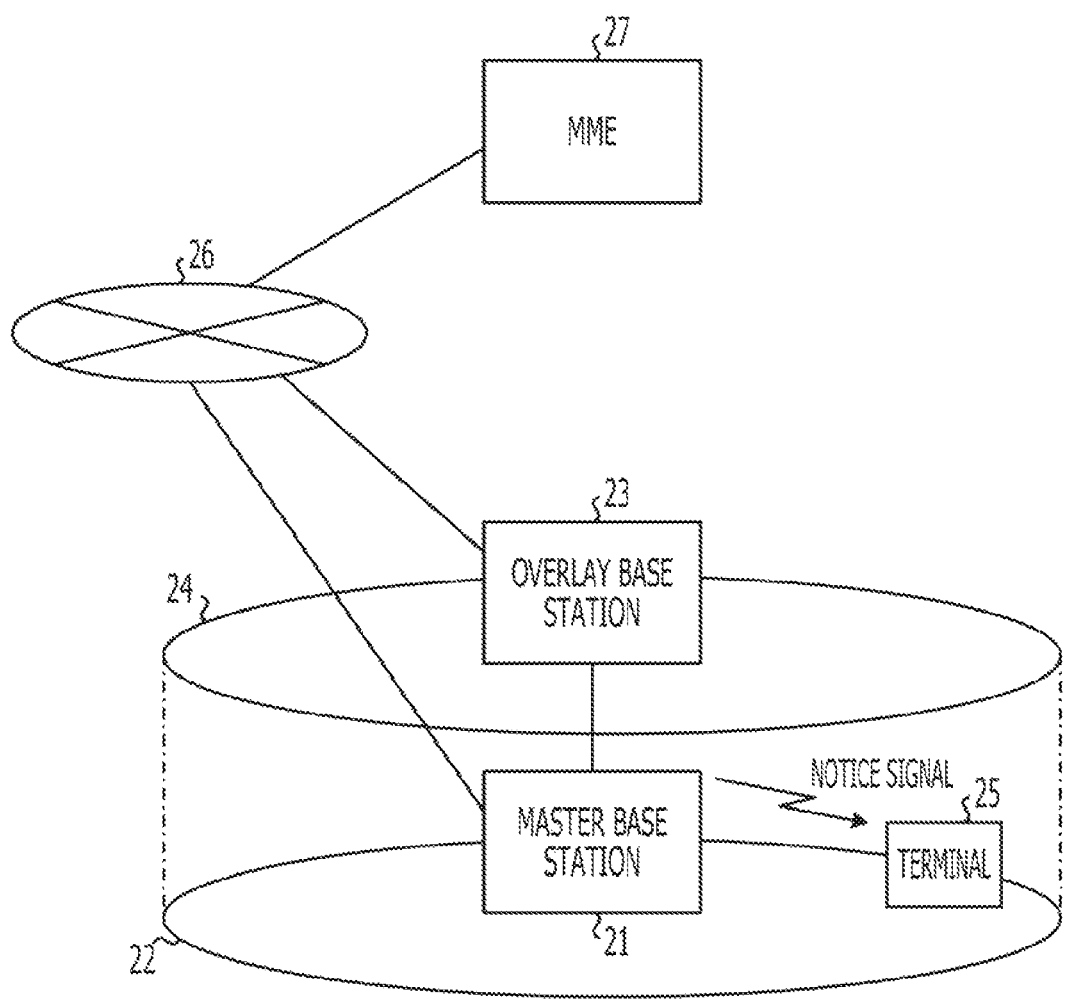
FIG. 4 is a block diagram illustrating a wireless communication system according to a second embodiment.

FIG. 4 is a block diagram illustrating a wireless communication system according to a second embodiment. As illustrated in FIG. 4, for example, a cell (e.g., cell 22) of a master base station 21 and a cell (e.g., cell 24) of an overlay base station 23 overlap each other. A terminal 25 connects to the master base station 21 when it is being located in the cell 22 of the master base station 21. Depending on an operation condition of the overlay base station 23, after the terminal 25 sends a call connection request to the master base station 21, the terminal 25 may connect to the overlay base station 23 based on a handover procedure before establishing a call connection to the master base station 21 and the overlay base station 23. The master base station 21 and the overlay base station 23 are connected to a network 26. A MME 27 is connected to this network 26.

The connection of the terminal 25 to the overlay base station 23 allows the terminal 25 to be accommodated in the overlay base station. Accordingly, a corresponding channel of the master base station 21 becomes free. The master base station 21 is equivalent to, for example, the first base station 1 in the first embodiment. The cell 22 of the master base station 21 is equivalent to, for example, the communication coverage area 2 of the first base station 1. The overlay base station 23 is equivalent to, for example, the second base station 3 in the first example. The cell 24 of the overlay base station 23 is equivalent to, for example, the communication coverage area 4 of the second base station 3.

Configuration of Base Station

Figure 5:
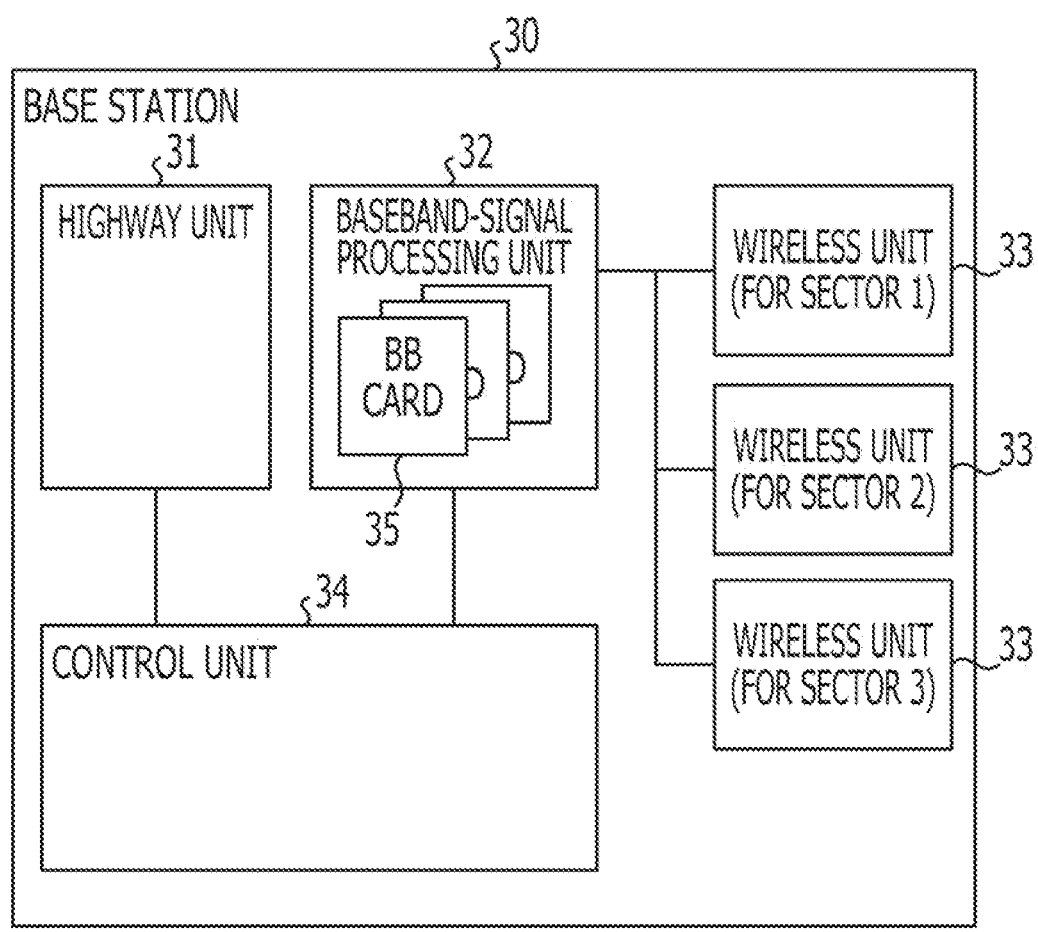
FIG. 5 is a block diagram illustrating a base station according to the second embodiment.

FIG. 5 is a block diagram illustrating a base station according to the second embodiment. A base station 30 includes a highway unit 31, a baseband-signal processing unit 32, a wireless unit 33, and a control unit 34. A CPU (Central Processing Unit), DSP (Digital Signal Processor) or the like provides functions executed by the control unit 34. The highway unit 31 is, for example, a physical interface including hardware. The highway unit 31 performs packet transmission/reception with a MME 27 or a serving gateway (not shown). The highway unit 31 performs packet transmission/reception with a base station which is operated in an overlay mode with the own station. The highway unit 31 performs packet transmission/reception with a base station which is not operated in an overlay mode with the own station. The baseband-signal processing unit 32 processes a baseband signal. The baseband-signal processing unit 32 includes one or more call-processing cards, baseband (BB) cards 35. The baseband-signal processing unit 32 communicates with one or more terminals 25 via the wireless unit 33. The wireless unit 33 includes an amplifier and an antenna, which are not shown in the figure. A baseband signal is converted into a wireless signal by the wireless unit 33 and then amplified by the amplifier, followed by being transmitted by the antenna. The wireless unit 33 converts a baseband signal received from the antenna into a wireless signal. For example, in the case where a cell includes a plurality of sectors, each sector is provided with its own wireless unit 33. The control unit 34 controls call in the base station 30. The control unit 34 controls the highway unit 31, the baseband-signal processing unit 32, and the wireless unit 33 and makes a connection to one or more terminals 24 or an upper core node such as the MME 27. The control unit 34 determines the quality of a wireless section. The control unit 34 controls a handover procedure with a base station which is operated in an overlay mode with the own station before establishing a call connection. The control unit 34 controls handover between the own station and a base station which is not operated in an overlay mode with the own station. The configuration of the master base station 21 is the same as the configuration of the base station 30 illustrated in FIG. 5. The configuration of the overlay base station 23 may be the same as the configuration of the base station 30 illustrated in FIG. 5.

Configuration of Control Unit of Base Station

Figure 6:
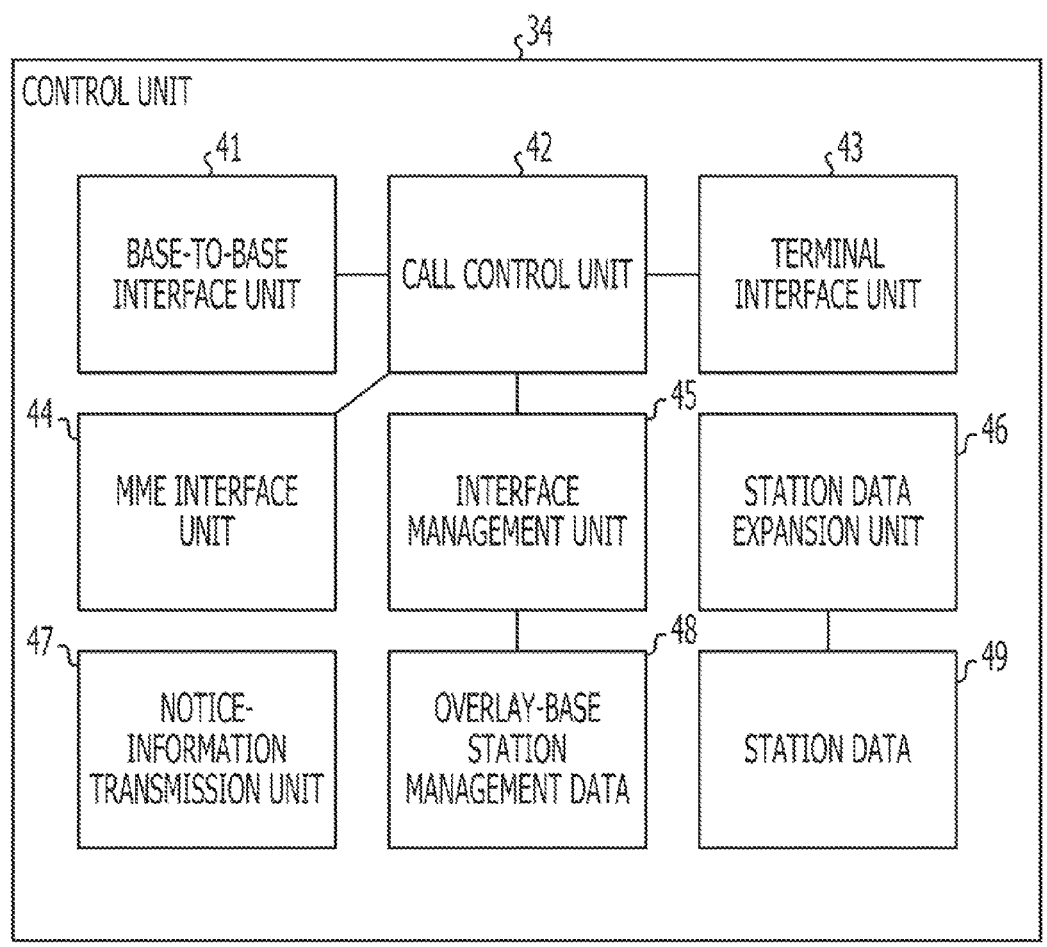
FIG. 6 is a block diagram illustrating a control unit of the base station according to the second embodiment.

FIG. 6 is a block diagram illustrating a control unit of the base station according to the second embodiment. The control unit 34 of the base station 30 includes a base-to-base interface unit 41, a call control unit 42, a terminal interface unit 43, a MME interface unit 44, an interface management unit 45, a station data expansion unit 46, a notice-information transmission unit 47, overlay-base station management data 48, and station data 49. The call control unit 42 controls the sequence of connection to a upper core node, such as the terminal 25 and the MME 27 and also controls the sequence of handover with a base station which is not operated in an overlay mode with the own station. The call control unit 42 performs control of the baseband-signal processing unit 32 or the wireless unit 33. The call control unit 42 controls the connection sequence and the handover sequence to the base station which is operated in an overlay mode with the own station. A CPU (Central Processing Unit), DSP (Digital Signal Processor) or the like provides functions executed by the call control unit 42. The terminal interface part 43 sends and receives a signal, such as a radio resource control signal (RRC), to and from the terminal 25. The base-to-base interface unit 41 sends and receives a signal, such as a X2AP signal, to and from a base station which is operated in an overlay mode with the own station or a base station which is not operated in an overlay mode with the own station. The MME interface unit 44 sends and receives a signal, such as a S1AP signal, to and from the MME 27. The terminal interface unit 43, the base-and-base interface unit 41, and the MME interface unit 44 perform signal transmission/reception using software or the like, respectively. The interface management unit 45 manages call-processing resources and wireless resources. When the base station 30 is a master base station, the interface management unit 45 also manages resources of the overlay base station. The station data 49 includes information about the presence or absence of an overlay base station and whether the own station is an overlay base station. For example, the station data 49 is stored in a memory. Exemplary station data 49 is illustrated in FIG. 7. The station data expansion unit 46 expands station data 49 into an available state at the time of starting or restarting the operation to determine the presence or absence of an overlay base station and whether the own station is an overlay base station. The overlay-base station management data 48 includes information about the operation status of an overlay base station. The overlay-base station management data 48 is stored in, for example, a memory. An exemplary overlay-base station management data 48 is illustrated in FIG. 8. The notice-information transmission unit 47 is responsible for transmission of call-connection notice information. When the base station 30 is a master base station, the notice-information transmission unit 47 sends call-connection notice information. When the base station 30 is an overlay base station, the notice-information transmission unit 47 does not need to send call-connection notice information.

The terminal interface part 43 is equivalent to each of the first interface units 11 and 16 in the first embodiment. The MME interface unit 44 is equivalent to each of the second interface units 12 and 17 in the first embodiment. The call control unit 42 is equivalent to each of the control units 13 and 18 in the first embodiment. When the base station 30 is one that only operates as an overlay base station, the configuration of the base station 30 as described above may not include the overlay-base station management data 48. In addition, if the overlay base station does not send call-connection notice information, the notice-information transmission unit 47 may not be required.

Exemplary Station Data

FIG. 7 is a block diagram illustrating exemplary station data of the base station according to the second embodiment. As illustrated in FIG. 7, the station data 49 includes, for example, information about the presence or absence of an overlay base station. When the overlay base station is present, the station data 49 also includes information about the address, frequency offset, the presence or absence of sectors, the number of cells which can be accommodated, and so on of the overlay information. The station data 49 includes, for example, information representing whether the own station is an overlay base station (such as "indication of overlay base station" in the figure) and information about the address of a master base station when the own station is the overlay base station. Furthermore, the station data 49 may include only part of these pieces of information or information other than the above information.

Exemplary Overlay-Base Station Management Data

FIG. 8 is a diagram illustrating exemplary overlay-base station management data of the base station of the second example. As illustrated in FIG. 8, the overlay-base station management data 48 includes, for example, information about the operation status of an overlay base station, information about operation state of each sector, information about the number of calls which can be accommodated in the overlay base station, and the number of calls in use. The information about the operation status of an overlay base station is one that represents whether a state of communication between the own station and the overlay base station is normal or whether they are in a disconnected state. The information about the operation status of each sector is, for example, one representing whether the amplifier or antenna of each sector is normal. Here, the overlay-base station management data 48 may include part of these pieces of information or other kinds of information.

Configuration of Terminal

Figure 9:
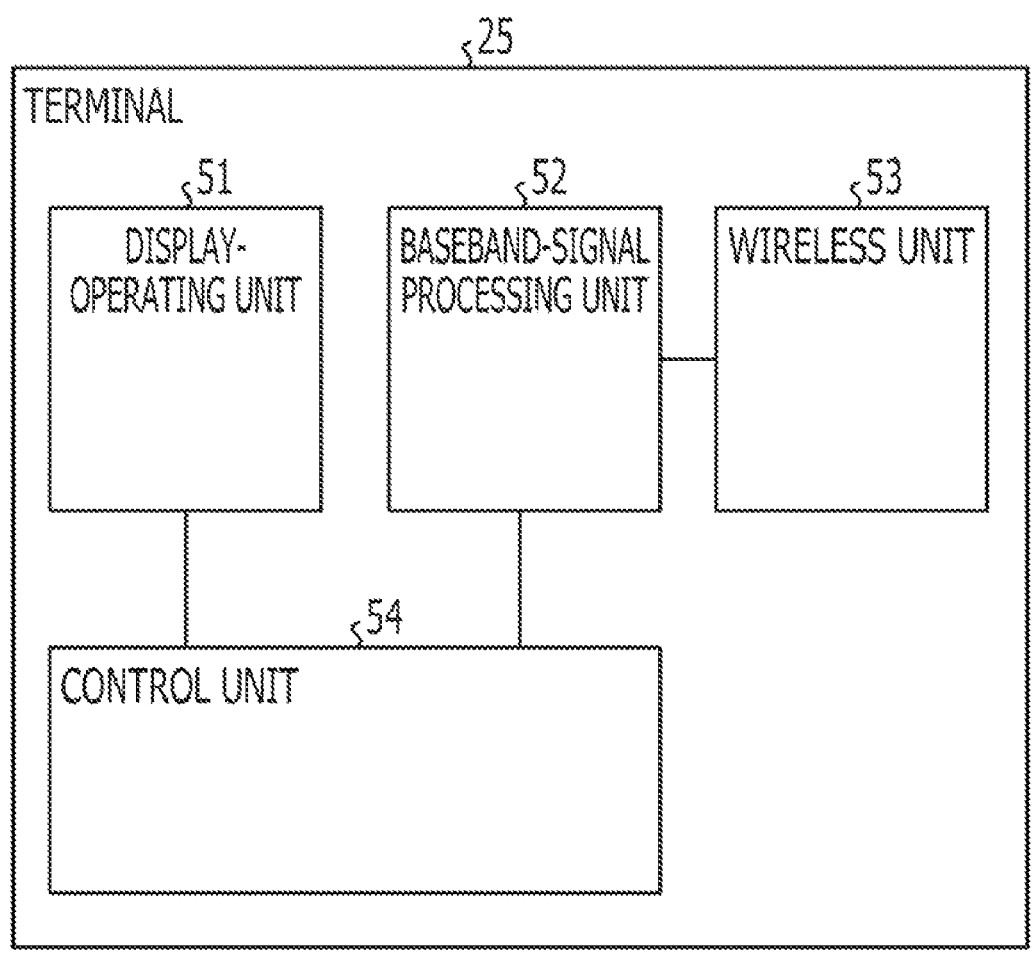
FIG. 9 is a block diagram illustrating a terminal according to the second example.

FIG. 9 is a block diagram illustrating a terminal according to the second example. As illustrated in FIG. 9, the terminal 25 includes a display-operating unit 51, a baseband-signal processing unit 52, a wireless unit 53, and a control unit 54. The display-operating unit 51 is responsible for screen display (not shown) or key input detection. The baseband-signal processing unit 52 processes a baseband signal. The baseband-signal processing unit 52 extracts a RPC signal and a packet signal from signals transmitted from the base station 30 via the wireless unit 53. The baseband-signal processing unit 52 hands out a RRC signal or a packet signal to the control unit 54. The baseband-signal processing unit 52 performs concealment processing and baseband signal processing on the signal passed from the control unit 54. The wireless unit 53 includes an amplifier and an antenna. The wireless unit 53 converts a baseband signal into a wireless signal and then amplifies the signal using the amplifier, followed by transmitting the signal from the antenna. The wireless unit 53 converts the wireless signal received from the antenna into a baseband signal. In an idle state or communication state, the control unit 54 controls the baseband-signal processing unit 52 and the wireless unit 53 and performs communication processing and packet processing to the base station 30.

Configuration of MME

Figure 10:
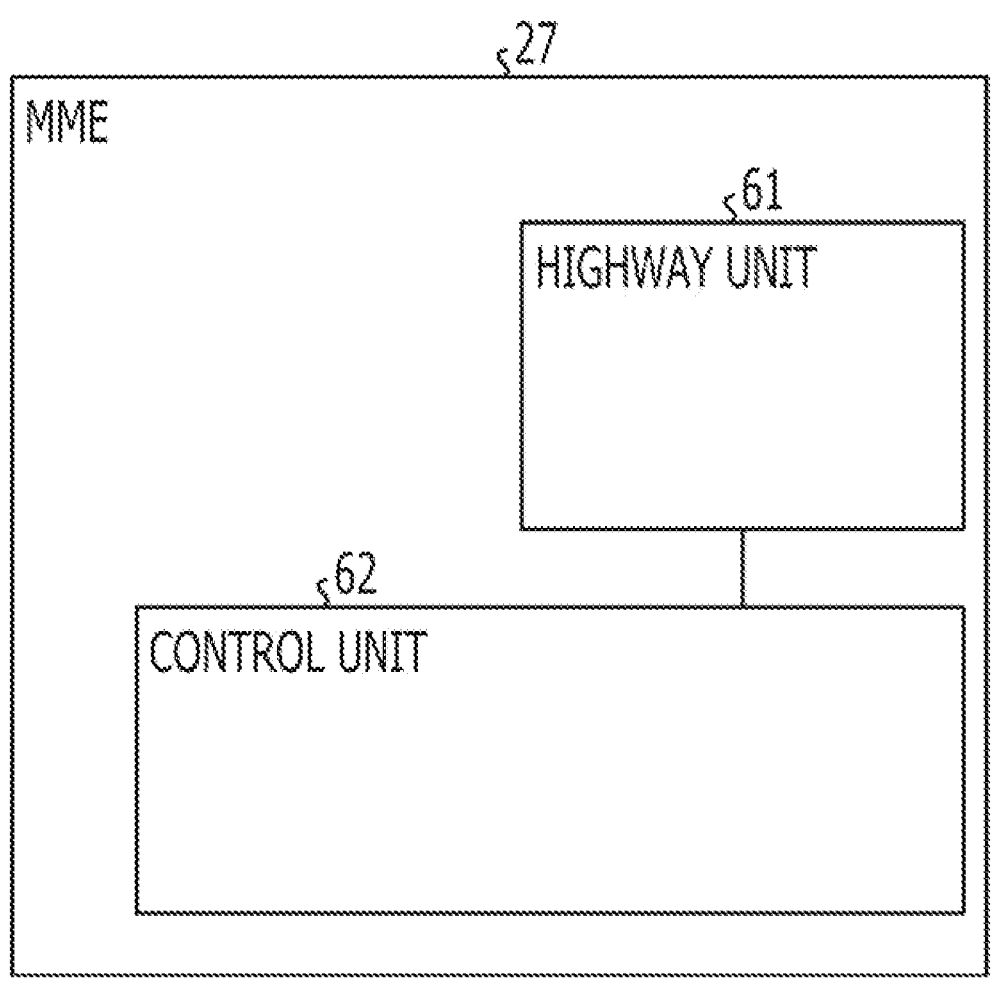
FIG. 10 is a block diagram illustrating a mobility management entity (MME) of the second embodiment.

FIG. 10 is a block diagram illustrating a MME according to the second embodiment. As illustrated in FIG. 10, the MME 27 includes a highway unit 61 and a control unit 62. The highway unit 61 is an interface for packet-signal transmission/reception between the MME 27 and the base station 30 and between the MME 27 and any of other nodes, such as those of a public telecommunication network including a serving gateway and an internet protocol multimedia subsystem (IMS). The control unit 62 processes signals from/to the base station 30 or any of other nodes via the highway unit 61. The control unit 62 manages the movement of the terminal 25. A CPU (Central Processing Unit), DSP (Digital Signal Processor) or the like provides functions executed by the control unit 62.

Exemplary Procedure for Starting (Restarting) Operation of Master Base Station

Figure 11:
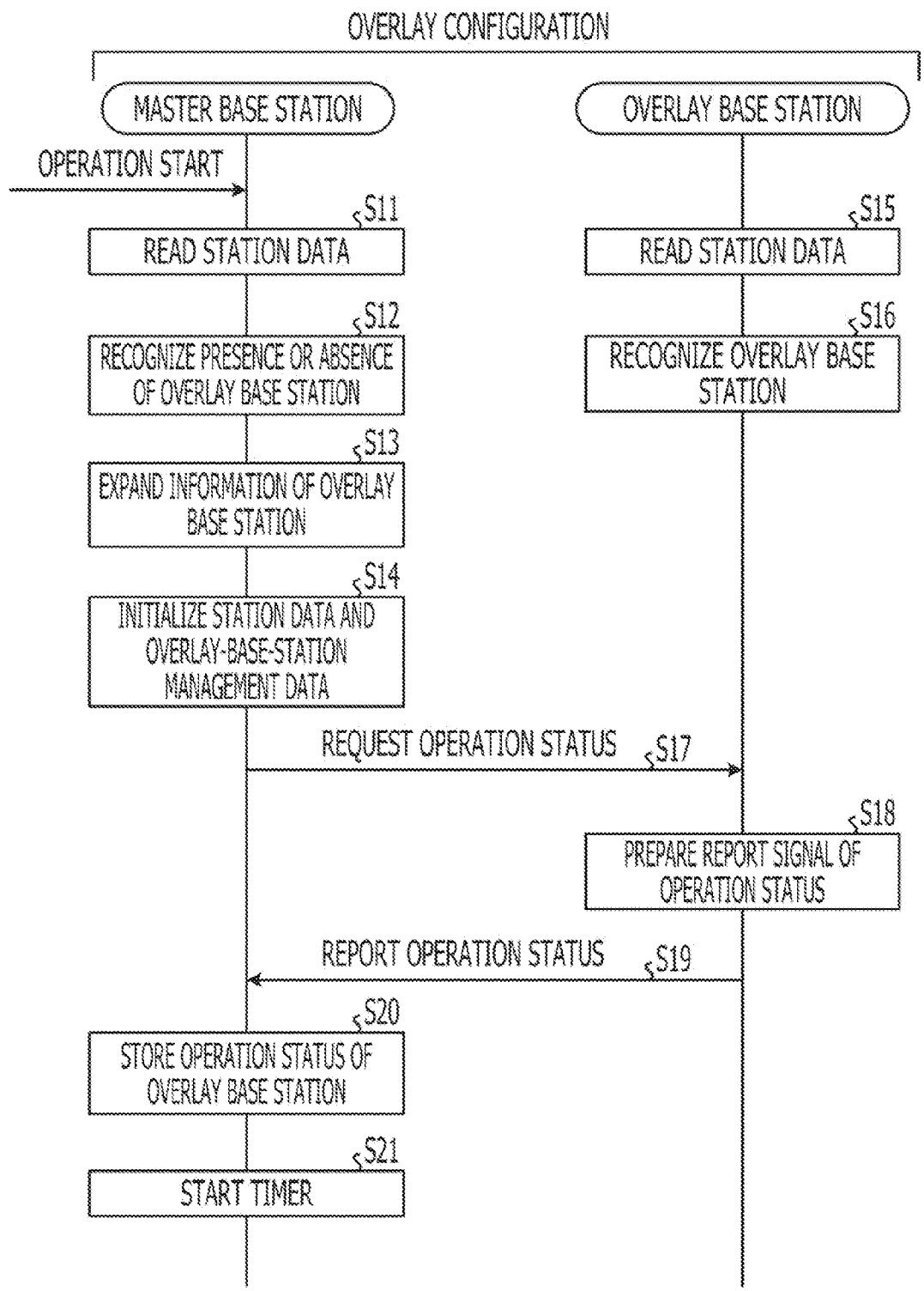
FIG. 11 is a sequence diagram illustrating an exemplary procedure at the time of start up of the base station in the wireless communication method according to the second embodiment.

FIG. 11 is a sequence diagram illustrating an exemplary procedure at the time of start up of the base station in the wireless communication method according to the second embodiment. As illustrated in FIG. 11, when the operation of the master base station 21 has started, the master base station 21 reads the station data 49 and then expands the station data 49 into available data using the station data expansion unit 46 (step S11). An available data indicates that master base station 21 can handle station data 49 by calculating, analyzing or the like. The master base station 21 recognizes the presence or absence of the overlay base station 23 based on the expanded station data 49 (step S12). If the overlay base station 23 is absent, the master base station 21 operates as a usual base station. Here, the presence of the overly base station 23 is assumed. Where the overlay base station 23 is present, the master base station 21 expands the information of the overlay base station 23 into available data (step S13). Subsequently, the master base station 21 initializes the station data 49 and the overlay-base station management data 48 (step S14).

On the other hand, the overlay base station 23 reads the station data 49 and then expands the station data 49 into available data using the station data expansion unit 46 (step S15). The overlay base station 23 recognizes that the own station is the overlay base station 23 based on the expanded station data 49 (step S16). The master base station 21 requests the overlay base station 23 the operation status thereof after initializing the station data 49 and the overlay-base station management data 48 (step S17).

When receiving the request for the operation status from the master base station 21, the overlay base station 23 collects the operation status of the own station and prepares a report signal (step S18). The overlay base station 23 sends the prepared report signal to the master base station 21 to report the operation status of the own station to the master base station 21 (step S19). The master base station 21 receives the operation-status report from the overlay base station 23 and then stores the operation status of the overlay base station 23 as overlay-base station management data 48 in, for example, a memory (step S20). Subsequently, the master base station 21 starts its built-in timer (step S21). The same procedure will be applied when the operation of the master base station 21 is restarted from the state of being stopped due to a certain reason.

Exemplary Procedure for Monitoring the Operation Status Between Base Stations

Figure 12:
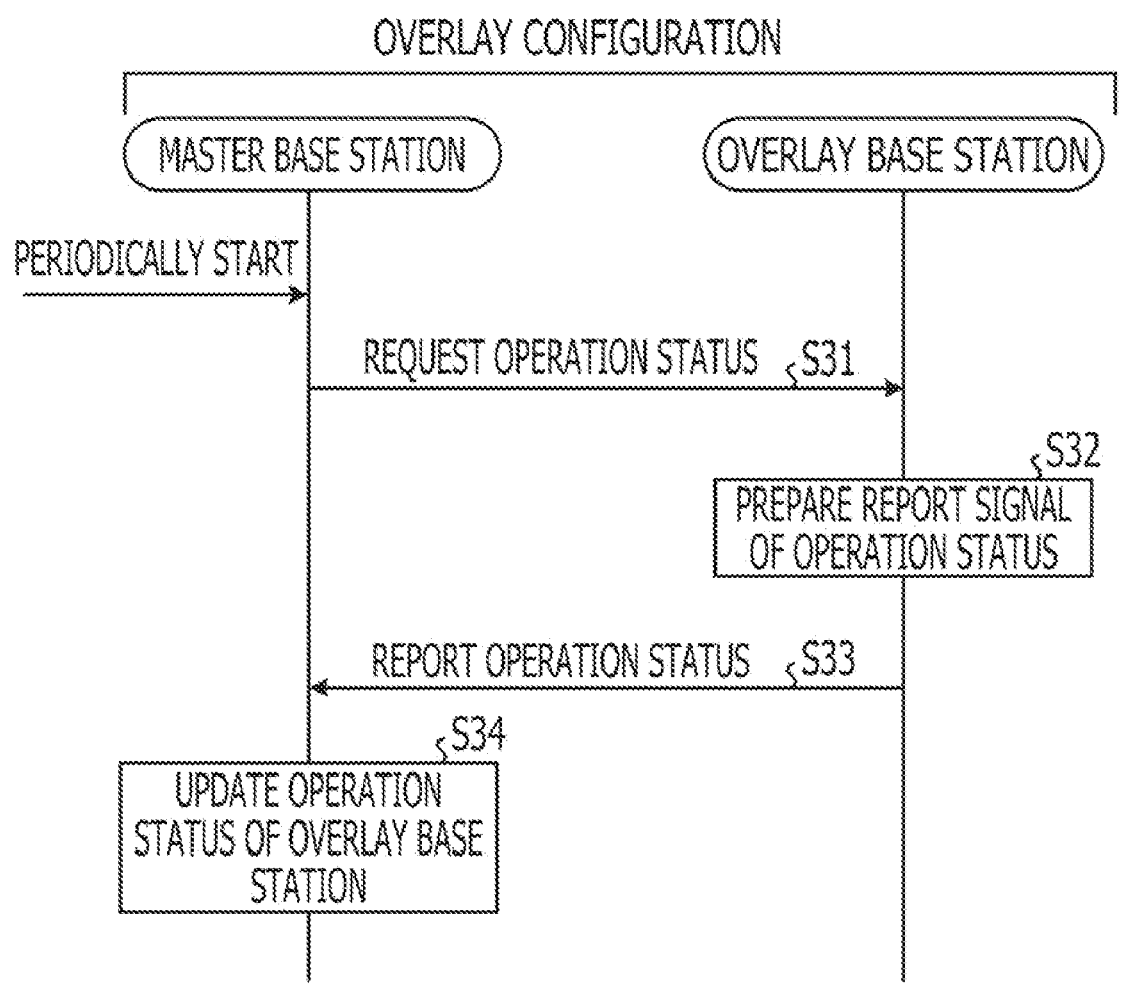
FIG. 12 is a sequence diagram illustrating an exemplary procedure for monitoring an operation status between the base stations in the wireless communication method according to the second embodiment.

FIG. 12 is a sequence diagram illustrating an exemplary procedure for monitoring the operation status between the base stations in the wireless communication method of the second embodiment. As illustrated in FIG. 12, in the master base station 21, when an event is periodically started by a timer initiated by the above step S21, the master base station 21 requests the overlay base station 23 for the operation status of the overlay base station 23 (step S31). The overlay base station 23 prepares a report signal in a manner similar to the above step S18 when receiving the request for the operation status from the master base station 21 (step S32). Then, the overlay base station 23 sends the prepared report signal to the master base station 21 to inform the master base station 21 about the operation status of the own station (step S33). After receiving the report about the operation status from the overlay base station 23, the master base station 21 updates the overlay-base-management data 48 based on the received operation status of the overlay base station 23 (step S34).

Exemplary Call Request Procedure from Terminal

Figure 13:
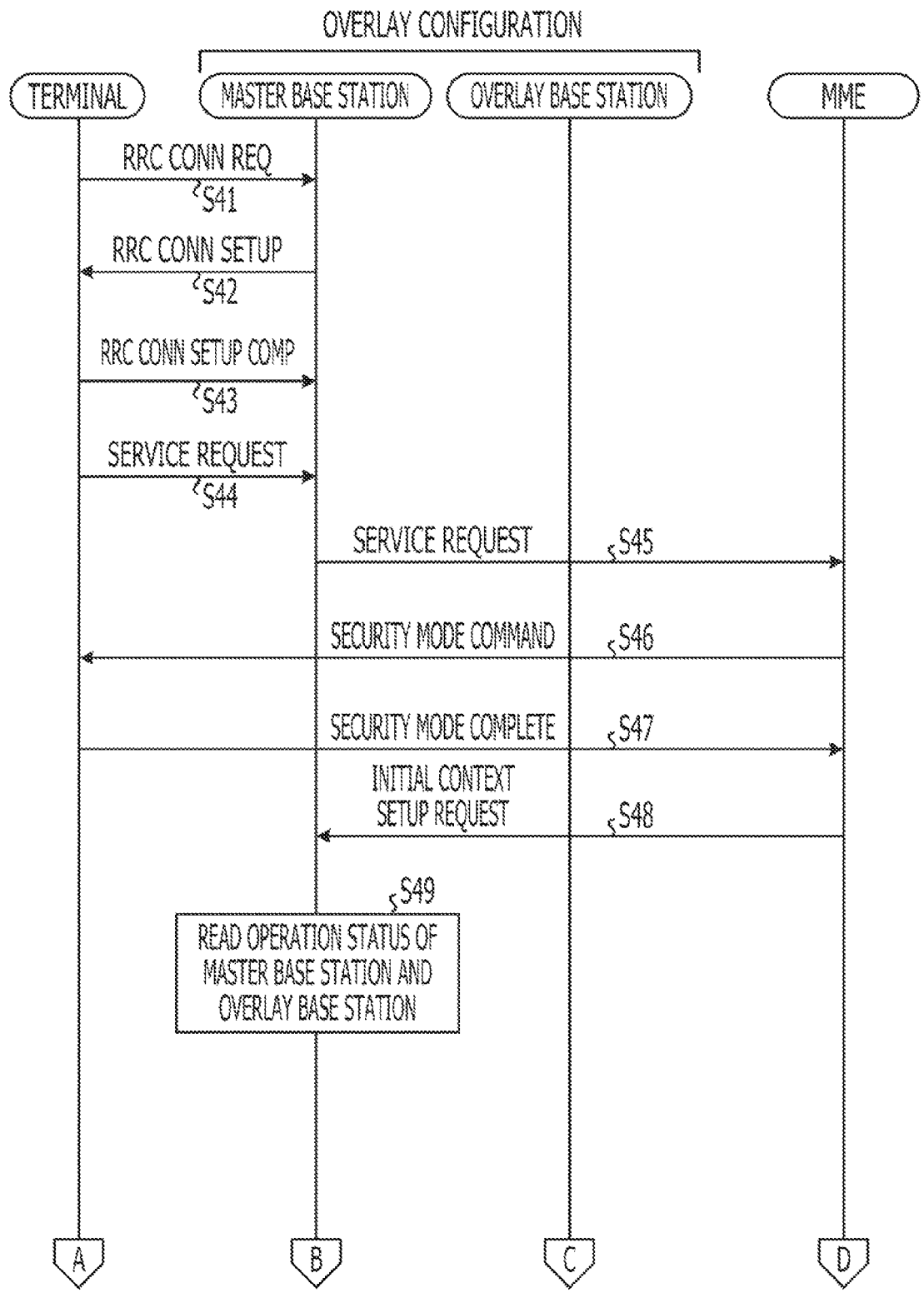
FIG. 13 is a sequence diagram illustrating an exemplary procedure of a call request from a terminal in the wireless communication method according to the second embodiment.
Figure 14:
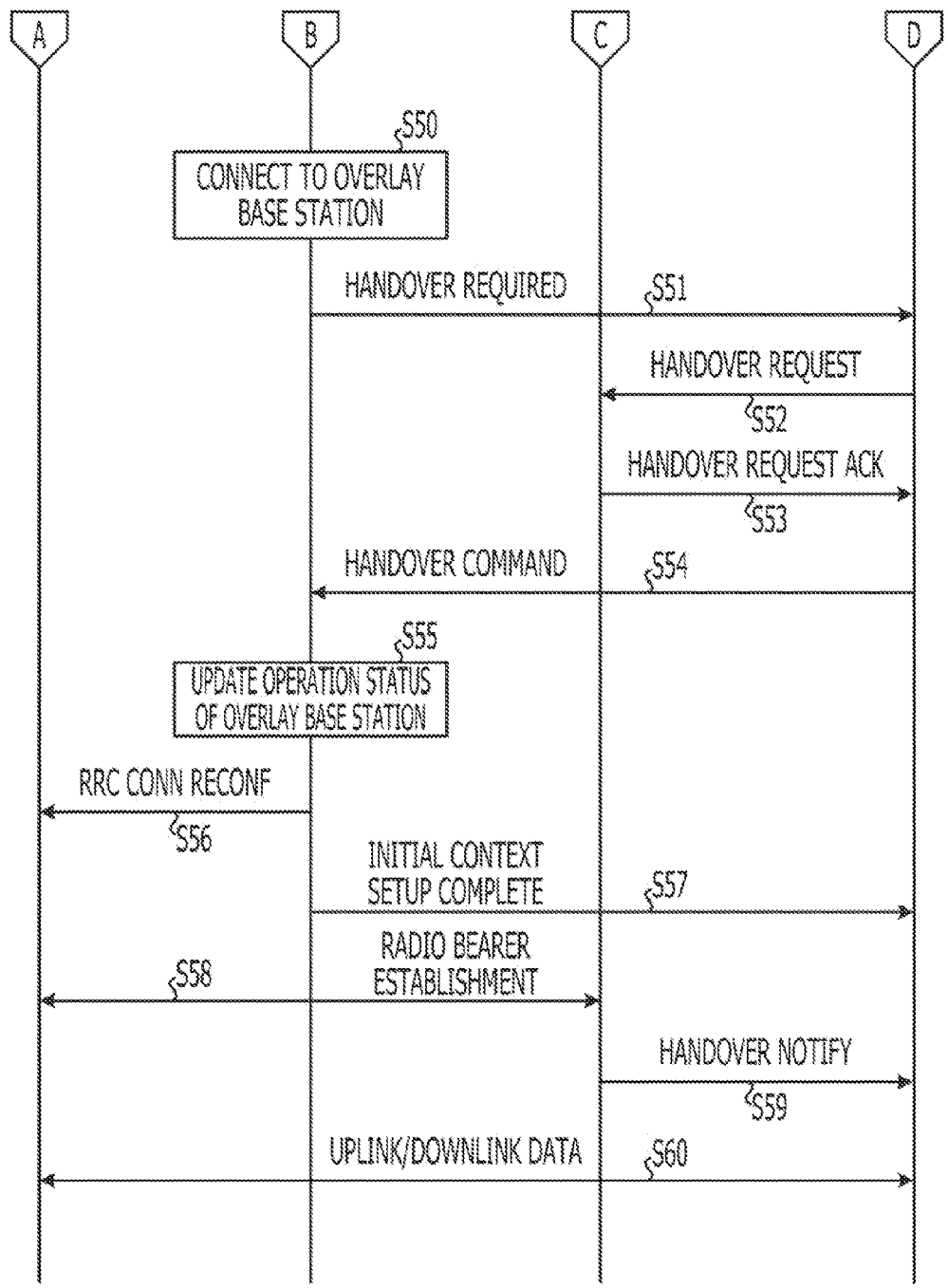
FIG. 14 is a sequence diagram illustrating a continuation of the sequence illustrated in FIG. 13.

FIG. 13 and FIG. 14 are sequence diagrams illustrating an exemplary procedure of a call request from the terminal in the wireless communication method according to the second embodiment. As illustrated in FIG. 13, at the time of a call request from the terminal, the terminal 25 requests the master base station 21, which sends call-connection notification information, about a RRC connection (RRC CONN Req: RRC Connection Request, step S41). The master base station 21 requests the terminal 25 to set up the RRC connection (RRC CONN SETUP: RRC Connection Setup, step S42). The terminal 25 sets up a RRC connection and notifies the master base station 21 that the setting of the RRC connection has completed (RRC CONN SETUP Comp: RRC Connection Setup Complete, step S43). Subsequently, the terminal 25 requests the master connection base station 21 to allow the terminal 25 to connection to its service (Service Request, step S44).

When the master base station 21 receives the request of connecting to its service from the terminal 25, the master base station 21 responses a call from the terminal 25 by assigning eNB UE S1AP ID as information for uniquely identifying the call (terminal) on a control plane (C plane). In the subsequent steps, the master base station 21 performs transmission/reception of communication signals between the master base station 21 and the MME 27 using the eNB UE S1AP ID. The master base station 21 requests the MME 27 to connect to the service (Service Request, step S45). The master base station 21 notifies the MME 27 of eNB UE SIAP ID in addition to request of connection to the service.

When the MME 27 receives eNB UE S1AB ID from the master base station 21, the MME 27 assigns to a call from the terminal 25 MME UE S1AP ID as information for uniquely identifying the call (terminal) on a C plane. In the subsequent steps, the MME 27 performs transmission/reception of communication signals between the master base station 21 ad the MME 27. The MME 27 transmits security information to the terminal 25 (security Mode Command, step S46). The MME 27 notifies the master base station 21 of MME UE S1AP ID in addition to such security information.

On the other hand, the terminal 25 sets up the security information and notifies the MME 27 that the setting of the security information has completed (Security Mode Complete, step S47). The MME 27 requests the master base station 21 to set up an initial context (Initial Context Setup Request, step S48). The master base station 21 reads the operation state of each of the master base station 21 and the overlay base station 23 (step S49).

As illustrated in FIG. 14, the master base station 21 determines whether the terminal 25 should be allowed to connect to the overlay base station 23 based on the operation state of the master base station 21 and the operation state of the overlay base station 23. For example, if calls which can be accommodated in the overlay base station 23 include free calls by which indicate terminals can communicate with another terminals, the master base station 21 may be determined that the terminal 25 is allowed to connect to the overlay base station 24. Alternatively, the number of free calls which can be accommodated in the overlay base station 23 is larger than the number of free calls which can be accommodated in the master base station 21, the master base station 21 may be determined that the terminal 25 is allowed to connect to the overlay base station 23. Here, it is assumed that the master base station 21 determines that terminal 25 is connected to the overlay base station 23 (step S50).

The maser base station 21 notifies the MME 27 that handover to the overlay base station 23 is required (Handover Required, step S51). The MME 27 assigns MME UE S1AP ID as information for uniquely identifying the call (terminal) on the C plane to the overlay base station 23. In addition, the MME 27 assigns UL GTP TEID as information for uniquely identifying the call (terminal) on a user plane (U plane) to the overlay base station 23. MME UE S1AP ID and UL GTP TEID are managed per connection. After that, the MME 27 performs transmission/reception of communication signals and packets between the MME 27 and the overlay base station 23 using these MME UE S1AP ID and ULGTP TEID. The MME 27 notifies the overlay base station 23 of the handover request (Handover Request, step S52). The MME 27 notifies the overlay base station 23 of MME UE S1AP ID and UL GTP TEID in addition to the handover request.

When the overlay base station 23 receives MME UE S1AP ID and UL GTP TEID, the overlay base station 23 assigns eNB UE S1AP ID as information for uniquely identifying the call (terminal) on the C plane to the MME 27. In addition, the overlay base station 23 assigns DL GTP TEID as information for uniquely identifying the call (terminal) on the U plane to the MME 27. In addition, eNB UE S1AP ID and DL GTP TEID are managed per connection. After that, the overlay base station 23 performs transmission/reception of communication signals and packets between the overlay base station 27 and the MME 27 using these eNB UE S1AP ID and DL GTP TEID. The overlay base station 23 notifies the MME 27 about the acceptance of handover (Handover Request Ack: Handover Request Acknowledgement, step S53). The overlay base station 23 notifies the MME 27 of eNB UE S1AP ID and DL GTP TEID in addition to the acceptance of handover.

The MME 27 instructs the handover to the master base station 21 (Handover Command, step S54). Since the operation status of the overlay base station 23 is changed by carrying out the handover, the master base station 21 updates the overlay-base station management data 48 (for example, "the number of calls in use") to one on which the operation status of the overlay base station 23 after the handover is reflected (step S55).

Subsequently, the master base station 21 notifies the terminal 25 about the frequency of the overlay base station 23 and notifies the terminal 25 about the resetting of RRC connection (RRC CONN Reconf: RRC Connection Reconfiguration) (step S56). The master base station 21 notifies the MME 27 that the setup of initial context has completed (Initial Context Setup Complete, step S57). Since the resetting of RRC connection and the setup of initial context have completed, a radio bearer is established between the terminal 25 and the overlay base station 23 (Radio Bearer Establishment, step S58). In other words, the connection destination of the terminal 25 is changed from the master base station 21 to the overlay base station 23 according to the handover procedure. The overlay base station 23 notifies the MME 27 that the handover has proceeded (Handover Notify, step S59). Subsequently, data transmission/reception on up and down links between the terminal 25 and MME 27 via the overlay base station 23 can be performed (step S60).

In step S50, when the master base station 21 determines that the terminal 25 is allowed to connect to the own station, a radio bearer is established between the terminal 25 and the master base station 21. In other words, the steps S51 to S59 are skipped, so that the connection destination is not changed from the master base station 21 to the overlay base station 23.

Exemplary Procedure for Handover from Another Base Station (for Example, Base Station of Cell Adjacent to Master Base Station or Overlay Base Station)

Figure 15:
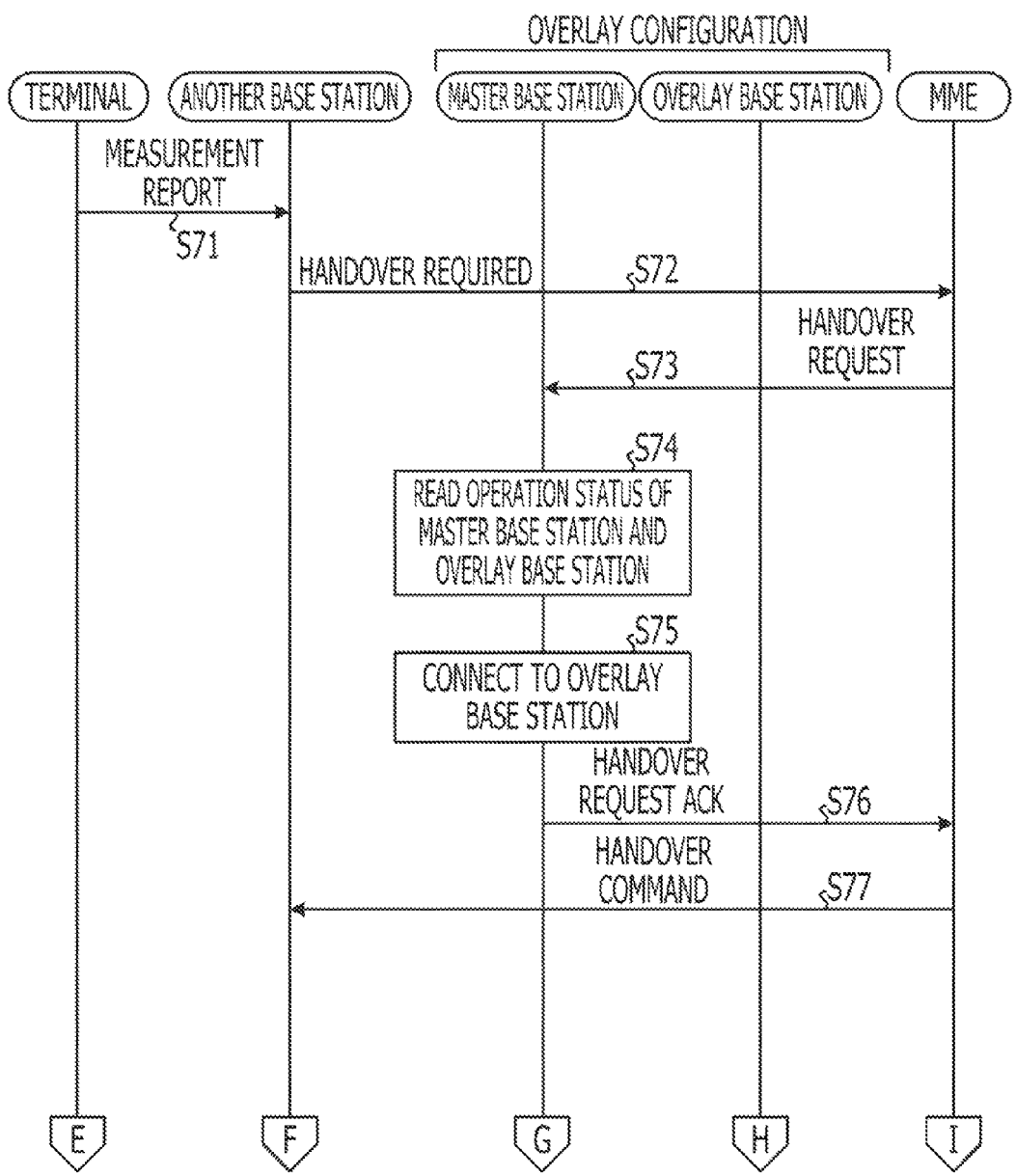
FIG. 15 is a sequence diagram illustrating an exemplary handover procedure from another base station in the wireless communication method according to the second embodiment.
Figure 16:
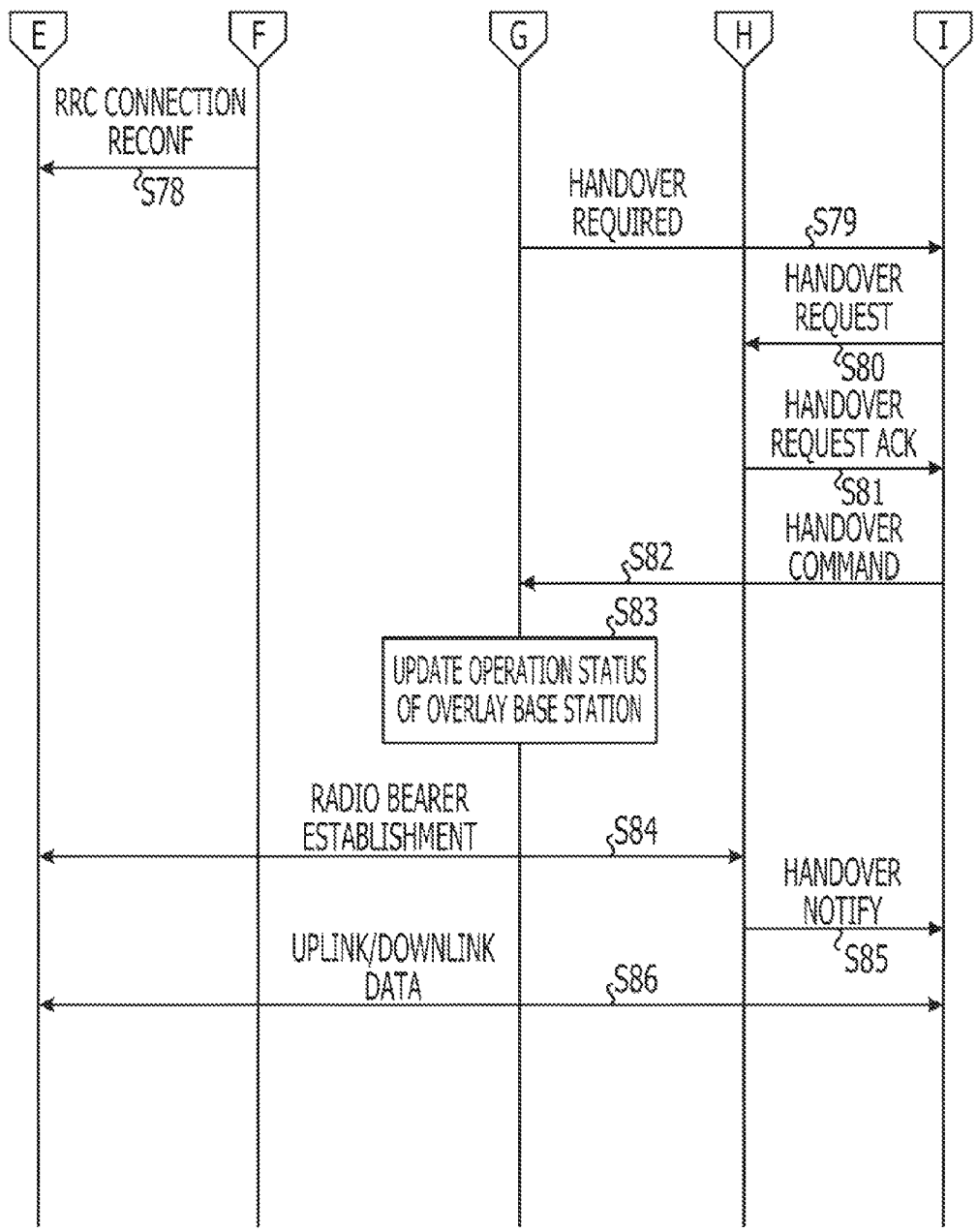
FIG. 16 is a sequence diagram illustrating a continuation of the sequence illustrated in FIG. 15.

FIG. 15 and FIG. 16 are sequence diagrams illustrating an exemplary handover procedure from another base station (for example, a base station of a cell adjacent to the master base station or the overlay base station) in the wireless communication method according to the second embodiment. As illustrated in FIG. 15, at the time of handover from another base station (for example, a base station of a cell adjacent to the master base station or the overlay base station), the terminal 25 measures communication quality and notifies this another base station (for example, a base station of a cell adjacent to the master base station or the overlay base station) of the result of measuring the communication quality (Measurement Report, Step S71). When the another base station (for example, a base station of a cell adjacent to the master base station or the overlay base station) has a poor quality of communication with the terminal 25, it notifies the MME 27 that there is a need of handover to, for example, the master base station 21 with good communication quality (Handover Required, step S72). The handover destination at his time is a master base station 21 that transmits call-connection notice information. The MME 27 notifies the master base station 21 about the request of handover (Handover Request, step S73).

The master base station 21 reads the operation state of each of the master base station 21 and the overlay base station 23 (step S74). The master base station 21 determines whether the terminal 25 should be allowed to connect to the overlay base station 23 based on the operation state of the master base station 21 and the operation state of the overlay base station 23. The determination criterion at this time may be, for example, one as described in the above step S50. Here, it is assumed that the master base station 21 determines that terminal 25 is connected to the overlay base station 23 (step S75). The maser base station 21 accepts handover and notifies the MME 27 that the overlay base station 23 is allowed to be the handover destination (Handover Request Ack, step S76). The MME 27 instructs another base station (for example, a base station of a cell adjacent to the master base station or the overlay base station) under connection with terminal 25 to handover (Handover Command, Step S77).

As illustrated in FIG. 16, another base station (for example, a base station of a cell adjacent to the master base station or the overlay base station) under connection to the terminal 25, notifies the terminal 25 about the frequency of the overlay base station 25 and informs that the overlay base station 23 is defined as a handover destination and a RRC connection is then reconfigured (RRC Connection Reconf, step S78). Subsequently, a radio bearer is established between the terminal 25 and the overlay base station 23 in a manner similar to the above steps S51 to S60 (but except of steps 56 and 57), and transmission/reception of uplink and downlink data (Uplink/Downlink Data) between the terminal 25 and the MME 27 is performed via the overlay base station 23 (steps S79 to S86). If the master bases station 21 determines that the terminal 25 is allowed to connect to the own terminal in step S75, another base station (for example, a base station of a cell adjacent to the master base station or the overlay base station) under connection to the terminal 25 notifies the terminal 25 about the frequency of the master base station 21 in step S78. In addition, the steps 79 to 85 are not performed. Furthermore, the handover destination from another base station (for example, a base station of a cell adjacent to the master base station or the overlay base station) under connection to the terminal 25 is set to the master base station 21, a radio bearer is established between the terminal 25 and the master base station 21.

Exemplary Call-Release Procedure in Overlay Base Station

Figure 17:
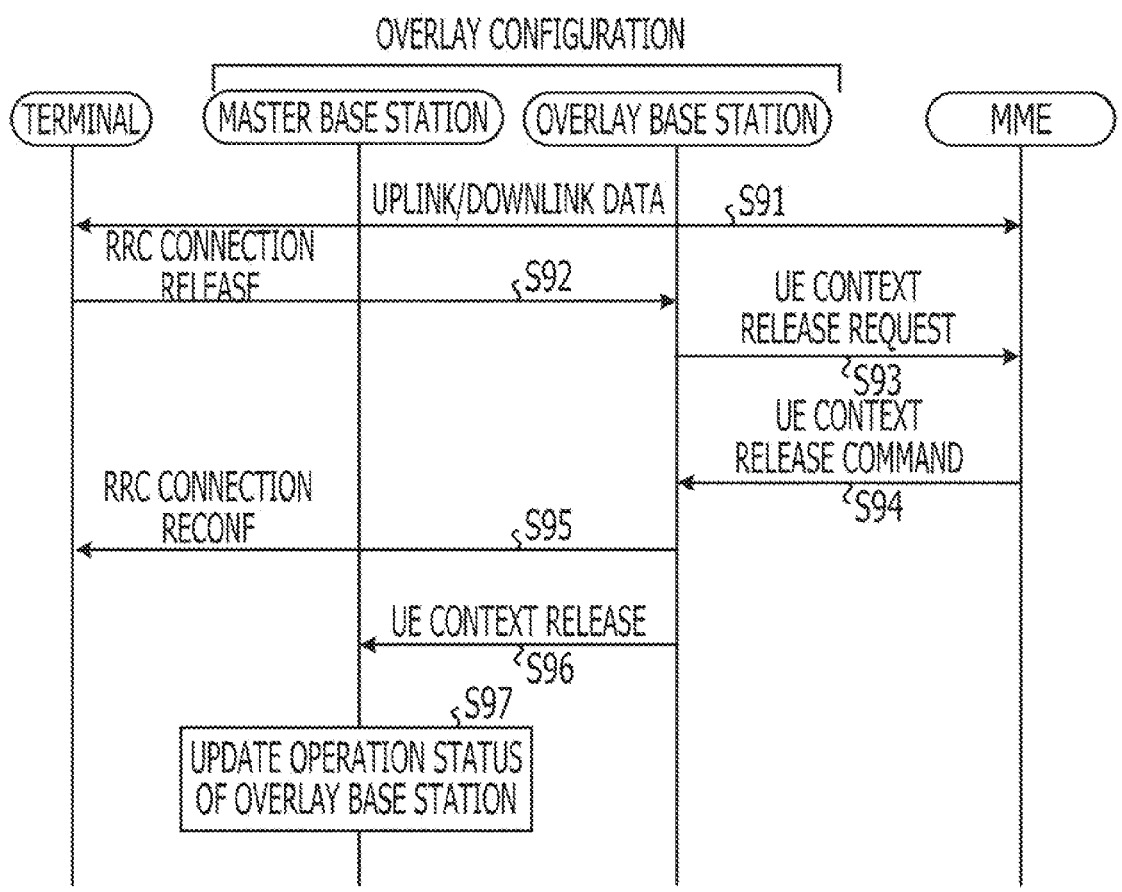
FIG. 17 is a sequence diagram illustrating an exemplary call-release procedure in the wireless communication method according to the second embodiment.

FIG. 17 is a sequence diagram illustrating exemplary call-release procedure in the wireless communication method of the second embodiment. As illustrated in FIG. 17, the terminal 25 is connected to the overlay base station 23 and performs transmission/reception of uplink and downlink data (Uplink/Downlink Data) between the terminal 25 and the MME 27 (step S91). Under this situation, the terminal 25 notifies the overlay base station 23 of call release (RRC Connection Release, step S92). The overlay base station 23 requires the MME 27 to release the context of the terminal (UE Context Release Request: User Equipment Context Release Request, step S93). The MME 27 directs the overlay base station 23 to release the context of the terminal (UE Context Release Command, step S94). The overlay base station 23 releases the call of the terminal 25 and notifies the terminal 25 of the reconfiguration of RRC connection (RRC Connection Reconf, step S95). The overlay base station 23 notifies the master base terminal 21 about the call release of the terminal 25 in response to, for example, an X2AP signal (UE Context Release, step S96). Since the call release causes a change in operation status of the overlay base station 23, the master base station 21 updates the overlay-base station management data 48 (for example, "the number of calls in use") to the content reflecting the operation status of the overlay base station 23 after the call release (step S97).

Exemplary Procedure for Handover from Overlay Base Station to Another Base Station (for Example, a Base Station of a Cell Adjacent to the Master Base Station or the Overlay Base Station)

FIG. 18 is a sequence diagram illustrating an exemplary handover procedure to another base station (for example, a base station of a cell adjacent to the master base station or the overlay base station) in the wireless communication method according to the second embodiment. As illustrated in FIG. 18, in a situation where the terminal 25 is connected to the overlay base station 23, the terminal 25 measures communication quality and notifies the overlay base station 23 about the result of measuring the communication quality (Measurement Report, step S101). The overlay base station 23 notifies the MME 27 that handover to another base station (for example, a base station of a cell adjacent to the master base station or the overlay base station) with good communication quality is required when the quality of communication between the own station and the terminal 25 is insufficient (Handover Required, step S102). The MME 27 notifies another base station (for example, a base station of a cell adjacent to the master base station or the overlay base station) about the request of handover (Handover Command, step S103). The above another base station (for example, a base station of a cell adjacent to the master base station or the overlay base station) notifies the MME 27 about the consent of handover (Handover Command, Step S104).

The MME 27 directs the overlay base station 23 to handover (Handover Command, Step S105). The overlay base station 23 notifies the terminal 25 about the frequency of the base station to be served as a handover destination and notifies the terminal 25 that a RRC connection is reconfigured using this base station as a handover destination (RRC Connection Reconf, step S106). The reconfiguration of the RRC connection establishes a radio bearer between the terminal 25 and another base station (for example, a base station of a cell adjacent to the master base station or the overlay base station) (Radio Bearer Establishment, step S107). In other words, handover from the overlay base station to another base station (for example, a base station of a cell adjacent to the master base station or the overlay base station) is performed. The handover destination, another base station (for example, a base station of a cell adjacent to the master base station or the overlay base station), notifies the MME 27 that the handover has proceeded (Handover Notify, step S108). Therefore, transmission/reception of uplink and downlink data (Uplink/Downlink Data) between the terminal 25 and the MME 27 is performed via another base station (for example, a base station of a cell adjacent to the master base station or the overlay base station), (step S109). The overlay base station 23 notifies the master base terminal 21 about the call release of the terminal 25 in response to, for example, an X2AP signal (UE Context Release, step S110). The master base station 21 updates the overlay-base station management data 48 to the content reflecting the operation status of the overlay base station 23 after the call release (step S111).

According to the second embodiment, the same effects as those of the first example can be obtained. In addition, when the overlay base station 23 does not send call-connection notice information (perch channel), electric power, which has been prepared to be assigned to call-connection notice information, can be now assigned to a user circuit. Therefore, the more capacity of the user circuit can be secured. In addition, by following the handover procedure when the connection destination of the terminal 25 is changed from the master base station 21 to the overlay base station 23, there is no need of allowing the overlay base station 23 to repeat the steps from the request of RRC connection. Therefore, a time required for establishing the wireless connection can be shortened. The power consumption of the terminal 25 can be reduced. Furthermore, when the number of users in the cell of the base station increases more than originally expected during the operation of the base station, an additional base station apparatus to be served as an overlay base station 23 may be installed in the office building of the base station. Thus, a flexible cell site design can be attained. Furthermore, the master base station 21 manages the resources of the overlay base station 23. Thus, even if there is no upper apparatus for controlling the maser base station 21 and the overlay base station 23, these base stations can operated in an overlay mode. In addition, the master base station 21 periodically acquires information about the operation status of the overlay base station 23 at the time of starting and during the operation of the own station. Thus, the operation status of the overlay base station can be always comprehended. Since the overlay-base station management data 48 is updated when the operation status of the overlay base station 23 is changed, the master base station 21 can always comprehend the operation status of the newest overlay base station 23.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system, comprising:
a first base station;
a second base station;
a first terminal which transmits call connection data to the first base station;
a second terminal which receives a call connection request; and
a management device which manages location and movement of the first terminal, wherein
the first base station employs a handover procedure to notify the management device, when receiving the call connection data from the first terminal, that a call connection destination of the second terminal which has received the call connection request is changed, and notifies the first terminal about a frequency of the second base station, and
the first terminal transmits call connection data to the second base station based on the notified frequency.

2. The wireless communication system according to claim 1, wherein
the first base station determines whether the first base station makes a call connection to the first terminal or whether the second base station is provided as a call connection destination of the first terminal based on the number of free calls among the number of calls which can be accommodated in the second base station.

3. A base station comprising:
a first interface unit which performs wireless-signal transmission/reception with a first terminal;
a second interface unit which connects to a management device that manages location and movement of the first terminal; and
a control unit, based on a call connection request from a second terminal which has received a call-connection notice information sent from the base station via the first interface unit, which employs the handover procedure to notify the management device, via the second interface unit, that the call connection destination of the first terminal is changed to an another base station having a communication coverage area which overlaps a communication coverage area of the first terminal, while notifying the first terminal about a frequency of the another base station via the first interface unit.

4. The base station according to claim 3, wherein
based on information about the number of free calls among the number of calls which can be accommodated in the another base station acquired from the another base station having a communication available area that overlaps a communication available area of the base station, the control unit determines whether the base station makes a call connection to the first terminal or the second base station is served as a call connection destination of the first terminal.

5. A base station comprising:
a first interface unit which performs wireless-signal transmission/reception with a first terminal;
a second interface unit which connects to a management device that manages location and movement of the first terminal; and
a control unit which makes a call connection to the first terminal via the first interface unit, wherein
based on a call connection request from a second terminal which has received a call-connection notice information sent from another base station having a communication coverage area that overlaps a communication area of the first base station, the control unit makes the call connection when the management device notifies the control unit that a call connection destination of the first terminal is changed to the first base station using a handover procedure via the second interface unit.

6. A wireless communication method in a wireless communication system including a first base station; a second base station; a first terminal which makes a call connection to the first base station or the second base station; and a management device which manages location and movement of the first terminal, the wireless communication method comprising:
notifying by first base station, when receiving the call connection from the first terminal, the call connection destination of the first terminal, which has received the call connection request, is changed to the second base station using a handover procedure, and also notifies a second terminal about a frequency of the second base station, and
performing by the first terminal, a call connection to the second base station based on the notified frequency.

7. The wireless communication method according to claim 6, wherein
in the notifying, based on the number of free calls among the number of calls which can be accommodated in the second base station, the first base station determines whether an own station makes a call connection to the first terminal or the second base station is served as a call connection destination of the first terminal.

8. A wireless communication method, comprising:
notifying, based on a call connection request from a first terminal which has received a call-connection notice information sent from a first base station, a management device, which is provided for managing location and movement of the first terminal, that a call connection destination of the first terminal is changed to a second base station having a communication coverage area that overlaps a communication coverage area of the first terminal by using a handover procedure; and
performing a notification of the frequency of the second base station to the first terminal.

9. The wireless communication method according to claim 8, wherein
in the notifying, the first base station determines whether the first base station makes a call connection to the first terminal or the second base station is served as a call connection destination of the first terminal, based on information about the number of free calls among the number of calls which can be accommodated in the another base station having the communication coverage area that overlaps the communication coverage area of the first base station.

10. A wireless communication method, comprising:
notifying, based on a call connection request from a first terminal which has received a call-connection notice information sent from a first base station having a communication coverage area that overlaps a communication area of a second base station, a management device, which is provided for managing location and movement of the first terminal, that a call connection destination of the first terminal is changed to the second base station by using a handover procedure; and
performing a call connection to the first terminal based on the notification from the management device.

* * * * *